US006840586B2

(12) United States Patent
Kusano et al.

(10) Patent No.: US 6,840,586 B2
(45) Date of Patent: Jan. 11, 2005

(54) BRAKING PRESSURE GENERATING APPARATUS FOR A VEHICLE (75) Inventors: Akihito Kusano, Toyota (JP); Satoshi Ishida, Chiryu (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/105,425

(22) Filed: Mar. 26, 2002

(65) Prior Publication Data

US 2002/0153215 A1 Oct. 24, 2002

(30) Foreign Application Priority Data

| Mar. 26, 2001 | (JP) | ........................................ 2001-088878 |
| Jun. 18, 2001 | (JP) | ........................................ 2001-183835 |

(51) Int. Cl.$^7$ ................................................. B60T 8/44
(52) U.S. Cl. ................................................... 303/114.1
(58) Field of Search .......................... 303/114.1, 113.3, 303/10, 15, 113.4, 116.1, 20, 155; 60/547.1, 554, 579, 421, 422

(56) References Cited

U.S. PATENT DOCUMENTS

| 4,126,996 | A | | 11/1978 | Leiber | |
| 4,346,942 | A | | 8/1982 | Leiber | |
| 4,603,918 | A | | 8/1986 | Leiber et al. | |
| 5,531,509 | A | * | 7/1996 | Kellner et al. | ........... 303/114.1 |
| 6,142,584 | A | * | 11/2000 | Towers et al. | ........... 303/114.1 |
| 6,478,385 | B1 | * | 11/2002 | Nishii et al. | ............. 303/114.1 |

FOREIGN PATENT DOCUMENTS

DE         29 18 785         11/1980

* cited by examiner

Primary Examiner—Robert A. Siconolfi
Assistant Examiner—Melanie Torres
(74) Attorney, Agent, or Firm—Burns, Doane, Swecker & Mathis, L.L.P.

(57) ABSTRACT

A braking pressure generating apparatus for a vehicle includes a hydraulic pressure generator for generating and outputting a power pressure irrespective of an operation of a brake pedal, and an input member connected with the brake pedal. A regulation valve is disposed coaxially with the input member to regulate the power pressure outputted from the hydraulic pressure generator to a predetermined pressure corresponding to the braking operation force of the brake pedal and output the predetermined pressure. The regulation valve includes a body and a valve portion movably disposed in the body. A force distribution device is disposed between the input member and the regulation valve to the distribute braking operation force applied to the input member the valve portion and the body of the regulation valve.

17 Claims, 7 Drawing Sheets

BRAKING PRESSURE GENERATING APPARATUS FOR A VEHICLE

This application is based on and claims priority under 35 U.S.C. §119 with respect to Japanese Patent Application No. 2001-088878 filed on Mar. 26, 2001 and Japanese Patent Application No. 2001-183835 filed on Jun. 18, 2001, the entire content of both of which is incorporated herein by references.

FIELD OF THE INVENTION

This invention generally relates to vehicle brake systems. More particularly, the present invention pertains to a braking pressure generating apparatus for a vehicle.

BACKGROUND OF THE INVENTION

Known braking pressure generating apparatus are disclosed in U.S. Pat. No. 4,126,996 published on Nov. 28, 1978 and U.S. Pat. No. 4,603,918 published on Aug. 5, 1986. Referring to the drawing figure in U.S. Pat. No. 4,126,996, the disclosed braking pressure generating apparatus includes a hydraulic pressure generator (54, 55) which generates and outputs a power pressure irrespective of operation of a brake pedal (2), and an input member (4) receiving the braking operation force through the brake pedal. A regulation valve (7) is disposed coaxially with the input member to regulate the power pressure outputted from the hydraulic pressure generator (54, 55) to a pressure corresponding to the braking operation force. To permit the input member stroke to correspond to the braking operation force, a travel spring (5) is disposed between the input member and a valve portion of the regulation valve so as to be compressed between the input member and the valve portion.

As shown in FIGS. 1 and 6 of U.S. Pat. No. 4,603,918, the disclosed braking pressure generating apparatus includes a hydraulic pressure generator (24, 25) which generates a power pressure irrespective of operation of a brake pedal (16) and an input member (79) which receives the braking operation force through the brake pedal. A regulation valve (71) is disposed non-coaxially with the input member to regulate the power pressure outputted from the hydraulic pressure generator to a pressure corresponding to the brake operation force. In order to permit the input member stroke to correspond to the braking operation force, a first spring (72) is disposed between the input member and a valve portion (74) of the regulation valve so as to be compressed between the input member and the valve portion and a second spring (FIG. 6) is disposed between the input member and a flange portion of a body (FIG. 6) so as to be compressed between the input member and the flange portion.

The relationship between the braking operation force and the output pressure of the regulation valve differs depending upon the vehicle model for which the braking pressure generation apparatus is applied. To change this relationship in the case of the apparatus described in U.S. Pat. No. 4,126,996, the diameter of the valve portion receiving the output pressure of the regulation valve (7) must be changed. In addition, the corresponding inner diameter of the valve body must be also changed. Such a change can involve significant costs.

In the case of the apparatus disclosed in U.S. Pat. No. 4,603,918, the braking operation force can be distributed to the valve portion and the body of the regulation valve by the first and second springs. Thus, the distribution rate, i.e., the relationship between the braking operation force and the output pressure of the regulation valve, can be changed by changing the characteristics (e.g., spring constant) of the first spring and/or the second spring. While such a change may not be as costly as that associated with the apparatus described in U.S. Pat. No. 4,126,996, other difficulties may arise. For example, because the two springs function as both the stroke simulator and the braking operation force distribution device, if the distribution characteristics are changed by changing the first and/or the second springs, the stroke simulator characteristics (i.e., the relationship between the braking operation force and the stroke of the input member) are varied. As a result, it is difficult to independently set both the distribution characteristics and the stroke simulator characteristics to the appropriate or desired characteristics.

A need thus exists for a vehicle braking pressure generation apparatus which is not as susceptible to the drawbacks and disadvantages discussed above.

SUMMARY OF THE INVENTION

A braking pressure generating apparatus for a vehicle includes a hydraulic pressure generator for generating and outputting a power pressure irrespective of an operation of a brake pedal, and an input member connectable to the brake pedal. A regulation valve is disposed coaxially with the input member to regulate the power pressure outputted from the hydraulic pressure generator to a predetermined pressure corresponding to the braking operation force of the brake pedal and output the predetermined pressure. The regulation valve includes a body and a valve portion movably disposed in the body. A force distribution device is disposed between the input member and the regulation valve to the distribute braking operation force applied to the input member the valve portion and the body of the regulation valve.

According to another aspect, a braking pressure generating apparatus for a vehicle includes a hydraulic pressure generator for generating and outputting a power pressure irrespective of operation of a brake pedal, an input member connectable to the brake pedal to receive a braking operation force through the brake pedal, and a regulation valve disposed coaxially with the input member to regulate the power pressure outputted from the hydraulic pressure generator to a predetermined pressure corresponding to the braking operation force of the brake pedal and outputting the predetermined pressure, with the regulation valve including a body and a valve portion movably disposed in the body. A one-piece elastic member is disposed between the input member and the regulation valve and receives the braking operation force from the input member, the elastic member contacts both the valve portion and the body when the predetermined pressure outputted from the regulation valve is more than a certain pressure.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Figure 1:
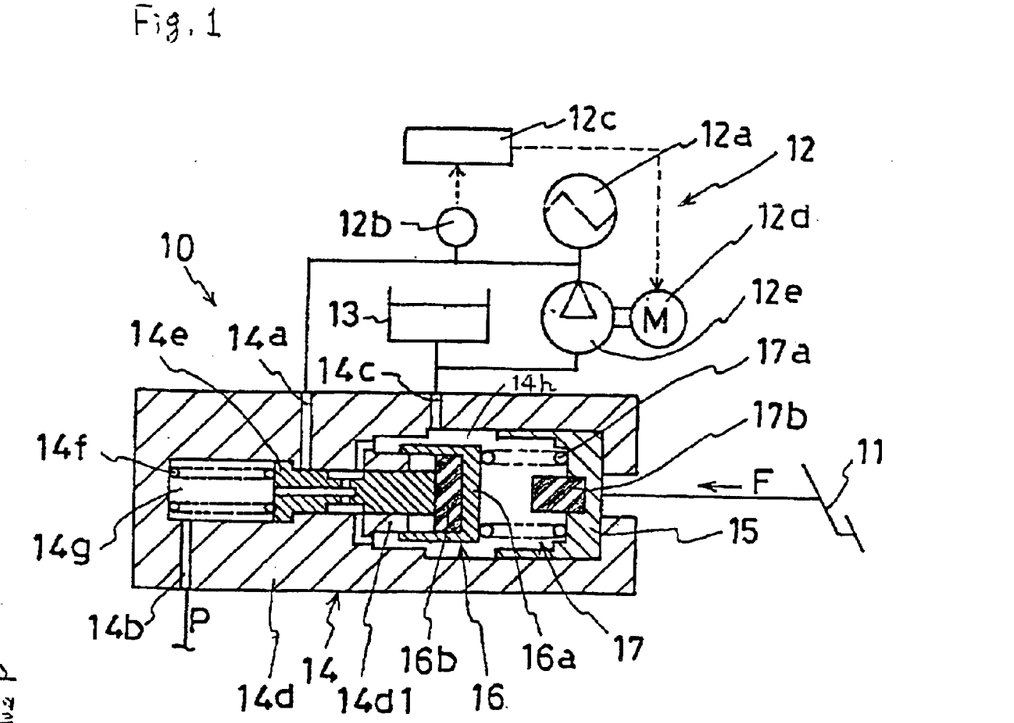
FIG. 1 is a partial cross-sectional view of a braking pressure generating apparatus for a vehicle according to a first embodiment of the present invention.

Referring initially to FIG. 1, a braking pressure generating apparatus 10 for a vehicle according to one embodiment includes a hydraulic pressure generator 12 operable as a power pressure source for generating a predetermined power pressure P1 irrespective of operation of a brake pedal 11 and outputting the power pressure P1. The hydraulic pressure generator 12 includes an accumulator 12a, a pressure sensor 12b, a DC electric motor 12d and a hydraulic pump 12e. The accumulator 12a accumulates the hydraulic fluid in the pressurized condition, while the pressure sensor 12b detects the pressure P1 accumulated in the accumulator 12a and outputs a signal indicative of the pressure to an electronic control device (hereinafter referred to as an ECU) 12c. The motor 12c is driven and controlled by the ECU 12c in response to the output of the pressure sensor 12b to drive the pump 12d. The pump 12d draws in hydraulic fluid from a reservoir 13, pressurizes the hydraulic fluid and supplies the pressurized hydraulic fluid to the accumulator 12a. The motor 12d is controlled such that the pressure P1 in the accumulator 12a is maintained between a lower limit value and an upper limit value.

The power pressure P1 outputted from the hydraulic pressure generator 12 is supplied to a regulation valve 14. The regulation valve 14 regulates the power pressure P1 to a hydraulic pressure P corresponding to the operating force of the brake pedal 11 and outputs the hydraulic pressure P. The regulation valve 14 is a so-called spool valve and includes a valve body 14d, a valve spool or valve portion 14e and a return spring 14f. The valve body 14d has an inlet 14a, an outlet 14b and a return passage 14c. The inlet 14a communicates with the hydraulic pressure generator 12 to receive the power pressure P1 outputted from the hydraulic pressure generator 12. The outlet 14b communicates with a wheel cylinder which applies braking force to a wheel of the vehicle. The return passage 14c communicates with the reservoir 13.

The valve spool 14e is slidably disposed in an inner bore of the valve body 14d. The return spring 14f biases or returns the valve spool 14e in the rightward direction relative to the valve body 14d. An output pressure chamber 14g is formed between the left end of the valve spool 14e and the valve body 14d, and communicates with the outlet 14b. A low-pressure chamber 14h is formed to the right end of the valve spool 14e and communicates with the return passage 14c.

In the position shown in FIG. 1, the valve spool 14e is located at a pressure-decrease condition of the regulation valve 14. The output pressure chamber 14g is separated from (i.e., not communicated with) the inlet 14a and communicates with the low-pressure chamber 14h. When the valve spool 14e moves by a certain distance in the leftward direction from the position shown in FIG. 1, the regulation valve 14 assumes a pressure-hold condition. In this pressure-hold condition, the output pressure chamber 14g is separated from both the inlet 14a and the low-pressure chamber 14h. When the valve spool 14e moves further in the leftward direction from the position in which the regulation valve 14 is in the pressure-hold condition, the regulation valve 14 assumes a pressure-increase condition. In this pressure-increase condition, the output pressure chamber 14g is separated from the low pressure chamber 14h and communicates with the inlet 14a.

An input member 15 is slidably disposed in the valve body 14d and is mechanically connected with the brake pedal 11. The input member 15 is located between the valve spool 14e and the brake pedal 11, and is coaxially disposed with respect to the valve spool 14e. The input member 15, together with the valve body 14d and the valve spool 14e, defines the low-pressure chamber 14h.

A force distribution device 16 is disposed between the input member 15 and the valve spool 14e to distribute the braking operation force applied to the input member 15 to the valve spool 14e and the valve body 14d. The force distribution device 16 includes a cylindrical movable member 16a, having a closed end and an open end, and a rubber member 16b serving as an elastic member. A cylindrical projecting portion 14d1 is integrally formed with the valve body 14d and projects toward the rubber member 16b of the force distribution device 16. The cylindrical projecting portion is positioned in the cylindrical movable member 16a in such a manner that the movable member 16a can slide relative to the cylindrical projecting portion 14d1.

The rubber member 16b is disposed in the cylindrical movable member 16a. The rubber member 16b is located between the movable member 16a and both of the valve spool 14e and the valve body 14d to be compressed between both the movable member 16a and the valve spool 14e and between the movable member 16a and the valve body 14d.

A stroke simulator 17 is disposed between the movable member 16a and the input member 15 to permit the input member 15 to move by a stroke corresponding to the braking operation force applied to the input member 15. The stroke simulator 17 includes a coil spring 17a and an elastic element in the form of a rubber member 17b, both of which are compressible. The preset load of the coil spring 17a is smaller than that of the coil spring 14f of the regulation valve 14. The valve spool 14e, the input member 15, the movable member 16a, the rubber member 16b, the coil spring 17a and the rubber member 17b are thus maintained at the positions shown in FIG. 1 when the brake pedal 11 is not operated. The right-side end of the rubber member 17b is supported in the input member 15 and a predetermined space is provided between the left-side end of the rubber member 17b and the movable member 16a when the brake pedal 11 is not operated.

Figure 2:
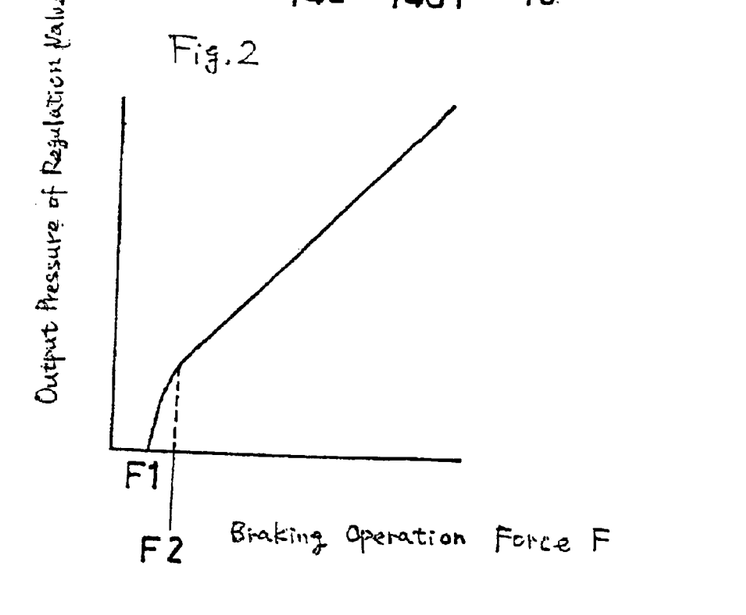
FIG. 2 is a graph showing the relationship between the braking operation force F and the hydraulic pressure outputted from a regulation valve in the braking pressure generating apparatus shown in FIG. 1.
Figure 3:
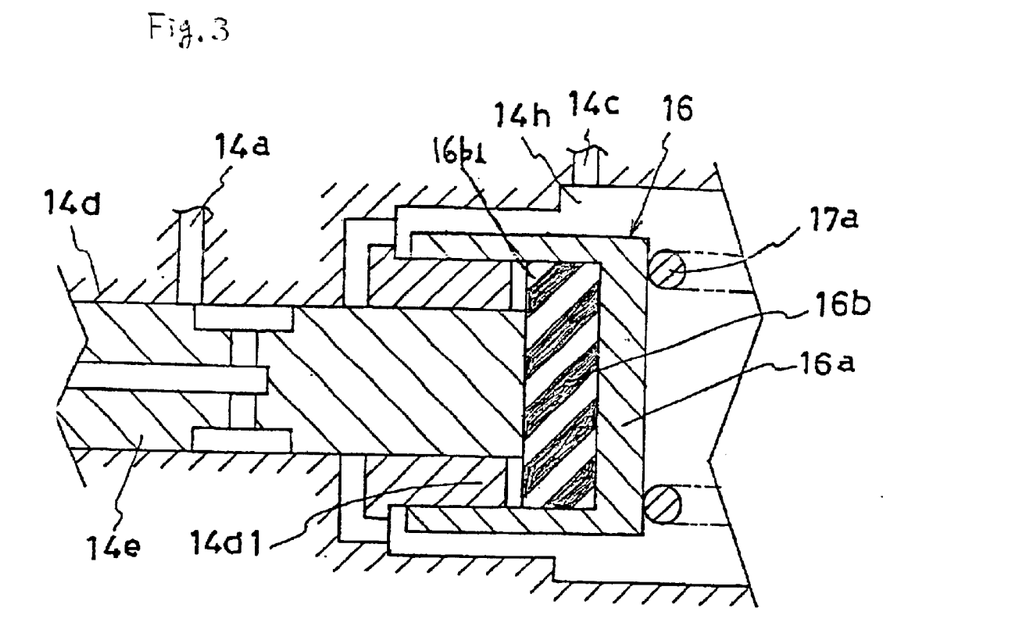
FIG. 3 is an enlarged cross-sectional view of a portion of the braking pressure generating apparatus shown in FIG. 1.

FIG. 2 is a graph showing the relationship between the braking operation force F applied to the input member 15 and the output pressure P of the regulation valve 14. When the braking operation force F is applied to the input member 15 through the brake pedal 11, the input member 15 and the rubber member 17b are integrally moved in a direction toward the left in FIG. 1 to compress the coil spring 17a. Then, the movable member 16a, the rubber member 16b and the valve spool 14e are integrally moved in a direction toward the left in FIG. 1 against the biasing force of the coil spring 14f. As a result, the regulation valve 14 is switched from the pressure-decrease condition to the pressure-increase condition via the pressure-hold condition to start to increase the output pressure P in the output pressure chamber 14g. This condition is shown in FIG. 3. As shown in FIG. 3, a space is maintained between the projecting portion 14d1 of the valve body 14d and the rubber member 16b of the force distribution device 16 immediately after the regulation valve 14 is switched to the pressure-increase condition.

The reaction force acts on the valve spool 14e by the output pressure P in the output pressure chamber 14g so as to push the valve spool 14e toward the rubber member 16b. As the reaction force increases by virtue of the increase of the output pressure P in the output pressure chamber 14g, the valve spool 14e is moved toward the rubber member 16b and then the regulation valve 14 is switched from the pressure-increase condition to the pressure-hold condition. As the reaction force acting on the valve spool 14e increases, the rubber member 16b is elastically deformed in such a manner that the outside portion 16b1 of the rubber member 16b opposing the projecting portion 14d1 of the valve body 14d expands toward the projecting portion 14d1. Then, the outside portion 16b1 of the rubber member 16b contacts the projecting portion 14d1.

Before this condition (i.e., when the outside portion 16b1 of the rubber member 16b is not yet in contact with the projecting portion 14d1), all of the braking operation force F is applied to the valve spool 14e through the rubber member 16b. On the other hand, after the outside portion 16b1 of the rubber member 16b contacts the projecting portion 14d1, the braking operation force F is distributed to the valve spool 14e and the projecting portion 14d1 of the valve body 14d though the rubber member 16b. This distribution ratio is determined by the contacting area S1 between the rubber member 16b and the valve spool 14e and the contacting area S2 between the rubber member 16b and the projecting portion 14d1. In other words, the distribution ratio is determined by the contacting area ratio S2/S1. While the contacting area S1 between the rubber member 16b and the valve spool 14e is always constant, the contacting area S2 between the rubber member 16b and the projecting portion 14d1 increases toward a predetermined value as the deformation amount of the rubber member 16b increases. The contacting area S2 increases while the braking operation force F increases from F1 to F2 in FIG. 2. Thus, when the braking operation force F is greater than F2, the contacting area ratio S2/S1 is constant and thus the distribution ratio of the force distribution device 16 is also constant. On the other hand, as the braking operation force F increases from F1 to F2, the distribution ratio increases from zero to the predetermined value. The braking operation force F1 refers to the braking operation force which is necessary for switching the regulation valve 14 from the pressure-decrease condition to the pressure-increase condition against the biasing force of the spring 14f.

When the braking operation force F is increased, the regulation valve 14 is switched from the pressure-hold condition to the pressure-increase condition and then is returned to the pressure-hold condition in response to the increase of the output pressure P in the regulation valve 14.

The coil spring 17a is compressed between the input member 15 and the movable member 16a in response to the braking operation force F applied to the input member 15 and then is moved relative to the valve body 14d in the direction toward the left from the position shown in FIG. 1. If the left end of the rubber member 17b contacts the movable member 16a by the movement of the input member 15 relative to the valve body 14d, the coil spring 17a and the rubber member 17b are compressed between the input member 15 and the movable member 16a in response to the braking operation force F and then is further moved relative to the valve body 14d in the direction toward the left. Thus, the spring 17a and the rubber member 17b permit the input member 15 or the brake pedal 11 to move by a stroke corresponding to the braking operation force F. The stroke change amount relative to the braking operation force change amount under the condition in which the rubber member 17b is not in contact with the movable member 16a is greater than that under the condition in which the rubber member 17b contacts the movable member 16a.

If the braking operation force F is decreased, the valve spool 14e of the regulation valve 14 is moved in the direction toward the right by the output pressure P in the output pressure chamber 14g. As a result, the regulation valve 14 is switched from the pressure-hold condition to the pressure-decrease condition and then is returned to the pressure-hold condition in response to a decrease of the output pressure P of the regulation valve 14.

The relationship between the braking operation force F and the output pressure P of the regulation valve 14 can be changed by changing the constant distribution ratio of the force distribution device 16. This constant distribution ratio can be changed by changing the diameter of the movable member 16a, the rubber member 16b and the projecting portion 14d1 without changing the diameter of the valve spool 14e.

The relationship between the braking operation force F and the output pressure of the regulation valve 14 before the distribution ratio of the force distribution device 16 reaches the constant distribution ratio can be changed by changing the shape of the opposing surfaces between the rubber member 16b and the projecting portion 14d1 and the opposing surfaces between the rubber member 16b and the valve spool 14e.

Figure 4:
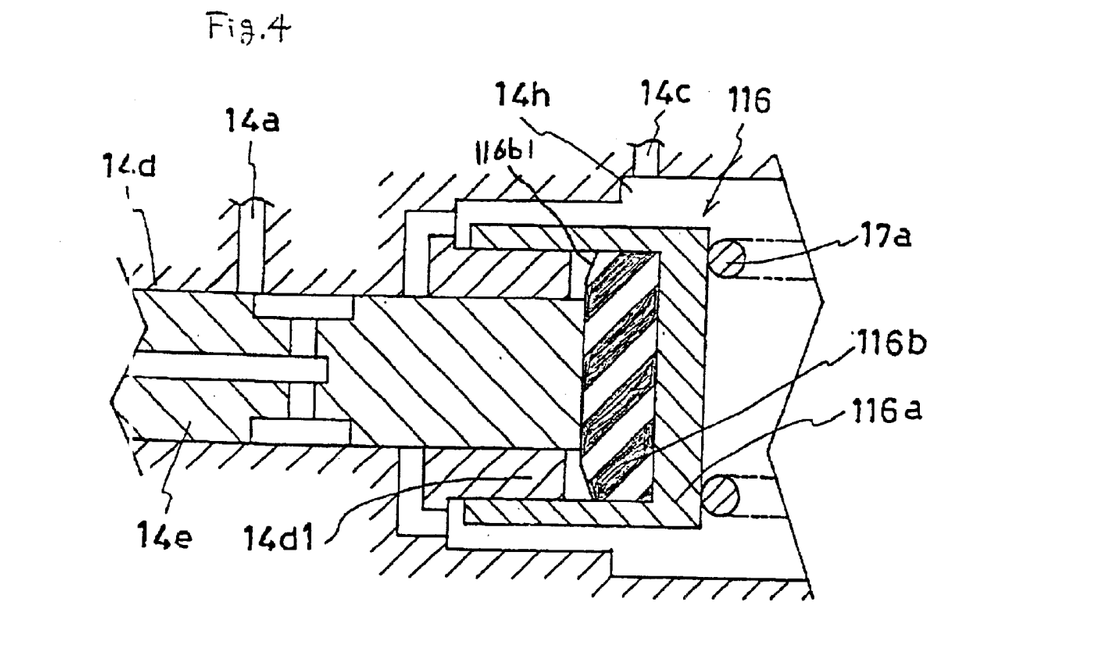
FIG. 4 is an enlarged cross-sectional view of a portion of a braking pressure generating apparatus according to a second embodiment of the present invention.

In a second embodiment shown in FIG. 4, the rubber member 16b of the distribution device 16 shown in FIG. 1 is replaced by a rubber member 116b of a distribution device 116. The rubber member 116b is a truncated cone-shaped member having a taper-shaped surface 116b1 opposing the projecting portion 14d1 in such a manner that the space or distance between the taper-shaped surface 116b1 and the projecting portion 14d1 increases in a direction outwardly of the taper-shaped surface 116b1.

Figure 5:
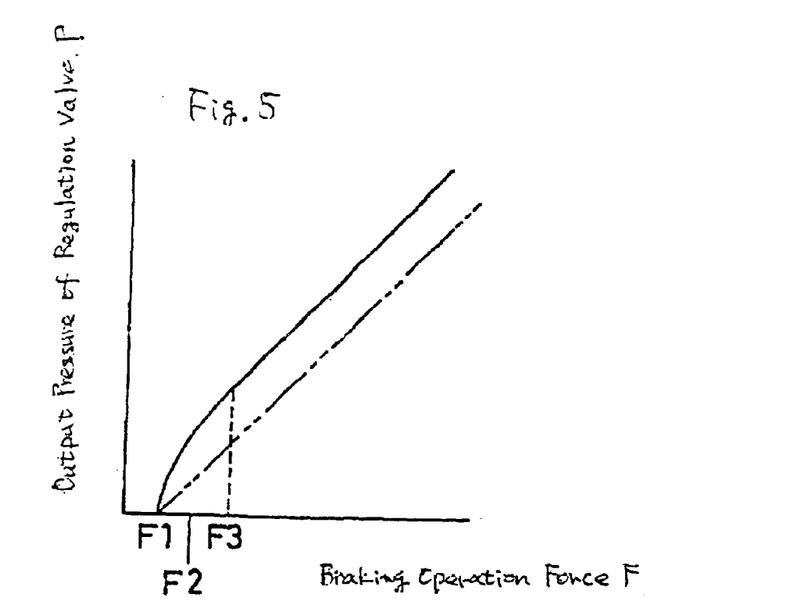
FIG. 5 is a graph showing the relationship between the braking operation force F and the hydraulic pressure outputted from the regulation valve in the braking pressure generating apparatus shown in FIG. 4.

FIG. 5 is a graph showing the relationship between the braking operation force F and the output pressure P of the regulation valve 14 according to the second embodiment shown in FIG. 4. The output pressure P of the regulation valve 14 increases along a curved line while the braking operation force F increases from F1 to F3 which is greater than F2.

Figure 6:
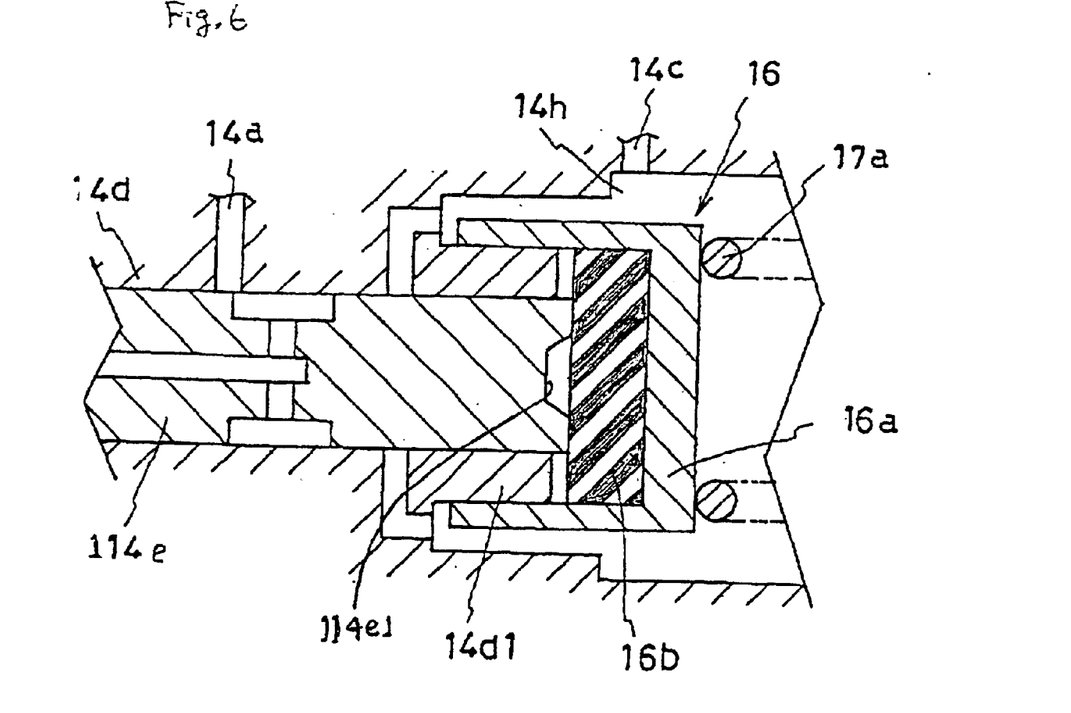
FIG. 6 is an enlarged cross-sectional view of a portion of a braking pressure generating apparatus according to a third embodiment of the present invention.

In a third embodiment shown in FIG. 6, the valve spool 14e in FIG. 1 is replaced with a valve spool 114e. This valve spool 114e has a concave or recessed portion 114e1 at a center region of the right end of the valve spool 114e which opposes or faces the rubber member 16b of the distribution device 16.

Figure 7:
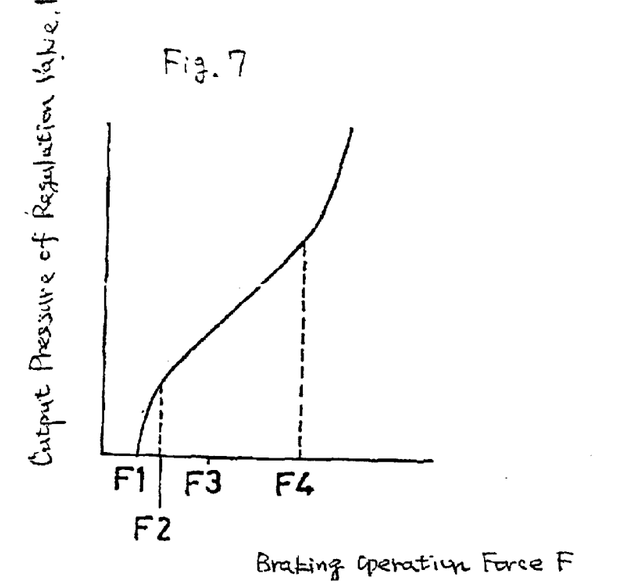
FIG. 7 is a graph showing the relationship between the braking operation force F and the hydraulic pressure outputted from the regulation valve in the braking pressure generating apparatus shown in FIG. 6.

FIG. 7 is a graph showing the relationship between the braking operation force F and the output pressure P of the regulation valve 14 according to the third embodiment shown in FIG. 6. As the braking operation force F increases from F1 to F2, the outside portion 16b1 of the rubber member 16b expands toward the projecting portion 14d1, and the contacting area between the rubber member 16b and the projecting portion 14d1 increases. As the braking operation force F further increases to F4 which is greater than F2, a center portion of the rubber member 16b expands inside the concave or recessed portion 114e1 of the valve spool 114e and the contacting area between the rubber member 16b and the valve spool 114e increases. Thus, as the braking operation force F increases from F1 to F2, the distribution ratio increases from zero to the certain ratio. While the braking operation force F increases from F2 to F4, the distribution ratio is kept at the certain ratio. As the braking operation force F further increases beyond F4, the distribution ratio decreases.

Figure 8:
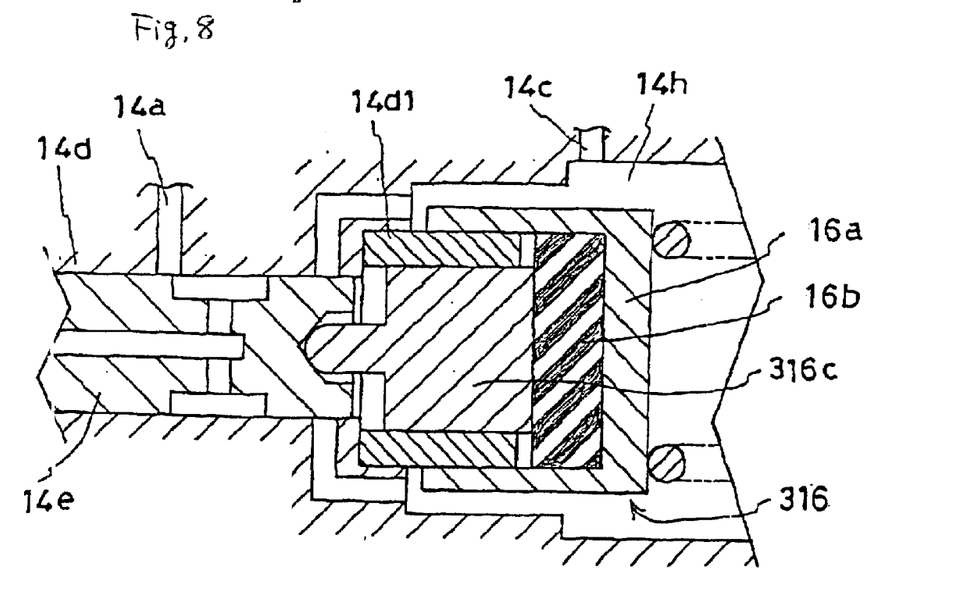
FIG. 8 is an enlarged cross-section view illustrating a portion of a braking pressure generating apparatus according to a fourth embodiment of the present invention.

FIG. 8 shows a portion of a braking pressure generating apparatus according to a fourth embodiment. The fourth embodiment differs from the first embodiment in the following manner. As shown in FIG. 8, the projecting portion 14d1 is separated from the valve body 14d and is fixed to it. Further, a transmission member 316c is disposed between the rubber member 16b and the valve spool 14e to transmit force from the rubber member 16b to the valve spool 14e. This transmission member 316c constitutes a force distribution device 316 together with the movable member 16a and the rubber member 16b. The constant distribution ratio of the distribution device 316 can be changed by changing the diameter of the transmission member 316c and the inner diameter of the projecting portion 14d1. As a result, the relationship between the braking operation force F and the output pressure P of the regulation valve 14 can be changed.

The change of the distribution ratio in the first, second, third and fourth embodiments does not influence the characteristics of the stroke simulator 17.

Figure 9:
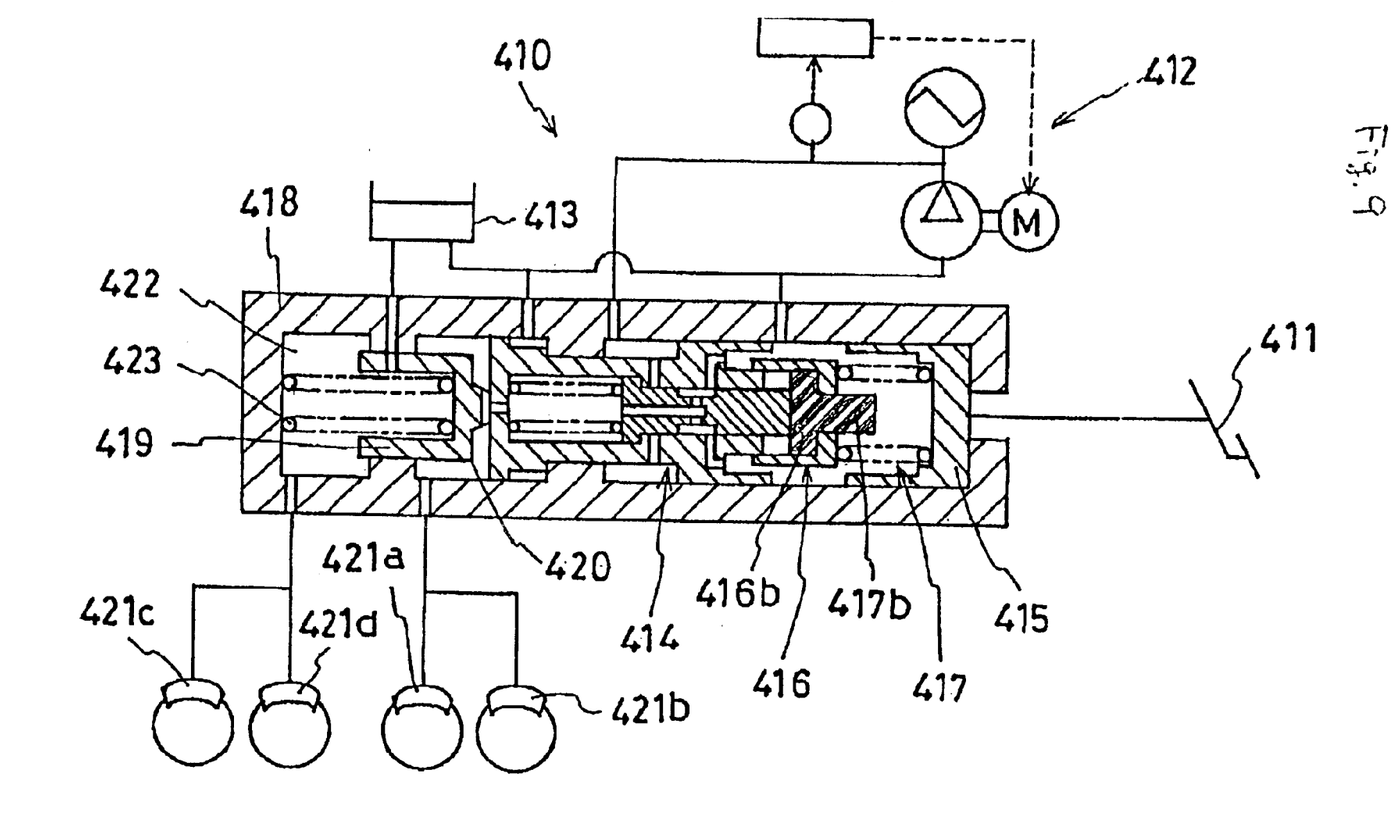
FIG. 9 is a partial cross-sectional view of a braking pressure generating apparatus according to a fifth embodiment of the present invention.

FIG. 9 illustrates a braking pressure generating apparatus 410 according to a fifth embodiment. In FIG. 9, features corresponding to those in the first embodiment are identified be the same reference numerals, except the reference numerals in FIG. 9 are preceded by a "4". The braking pressure generating apparatus 410 is different from that according to the first embodiment in the following manner.

A fixed cylinder 418 accommodates the regulation valve 414, the input member 415, the force distribution device 416 and the stroke simulator 417. The rubber member 417b of the stroke simulator 417 is integrally formed with the rubber member 416b of the distribution device 416 and projects toward the input member 415. A master cylinder piston 419 is slidably disposed in the cylinder 418 at the left side of the regulation valve 414. An auxiliary pressure chamber 420 is formed between the master cylinder piston 419 and the regulation valve 414. A master cylinder pressure chamber 422 is formed between the master cylinder piston 419 and the cylinder 418. The master cylinder piston 419 is biased toward the regulation valve 414 by a return spring 423. The output pressure of the regulation valve 414 is supplied to a pair of wheel cylinders 421a, 421b by way of the auxiliary pressure chamber 420. A pressure corresponding to the output pressure of the regulation valve 414 is generated in the master cylinder pressure chamber 422 and then is supplied to a pair of wheel cylinders 421c, 421d.

Figure 10:
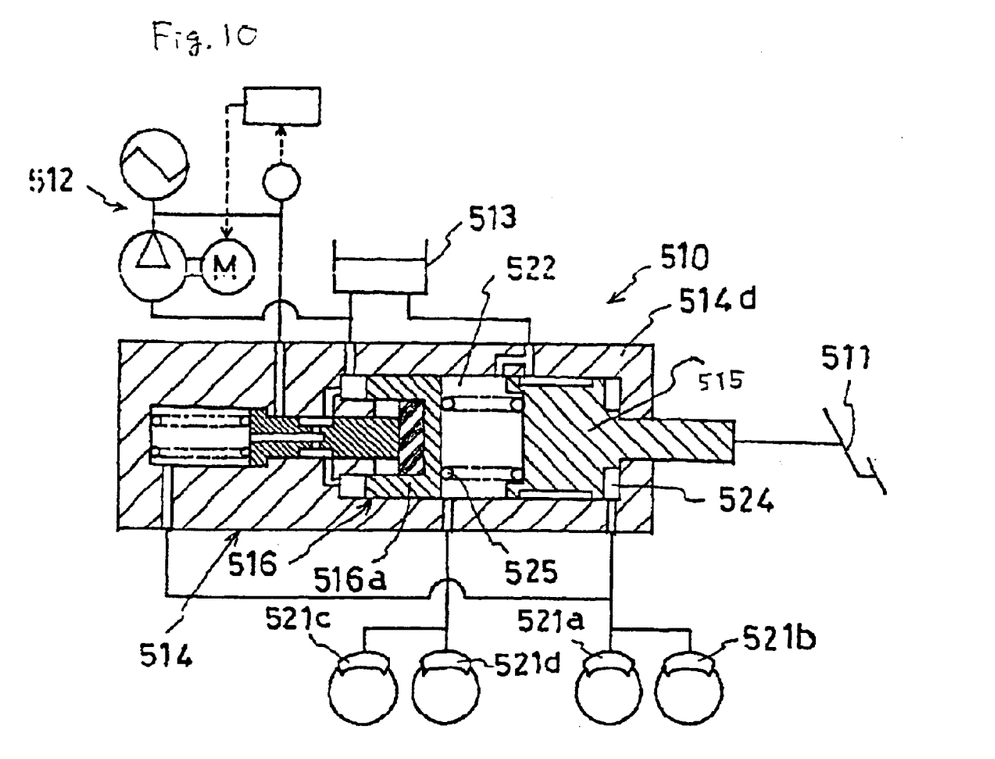
FIG. 10 is a partial cross-sectional view of a braking pressure generating apparatus according to a sixth embodiment of the present invention.

FIG. 10 illustrates a braking pressure generating apparatus 510 according to a sixth embodiment. In FIG. 10, features corresponding to those in the embodiment shown in FIG. 1 are identified by the same reference numerals, except that the reference numerals used in FIG. 10 are preceded by a "5". The braking pressure generating apparatus 510 shown in FIG. 10 differs from that of the first embodiment in the following manner.

The input member 515 constitutes a master cylinder piston. A master cylinder pressure chamber 522 is formed between the input member 515 and the movable member 516a of the force distribution device 516. An auxiliary pressure chamber 524 is formed between the input member 515 and the right end of the valve body 514d. The input member 515 as the master cylinder piston is biased toward the auxiliary pressure chamber 524 by a return spring 525. The output pressure of the regulation valve 514 is supplied both to a pair of wheel cylinders 521a, 521b and to the auxiliary pressure chamber 524. The input member 515 is moved in the direction toward the left by both the pressure in the auxiliary pressure chamber 524 and the braking operation force F. As a result, the master cylinder pressure is generated in the master cylinder pressure chamber 522 and is supplied to a pair of wheel cylinders 521c, 521d. The function of the stroke simulator is performed by discharging the master cylinder pressure from the master cylinder pressure chamber 522 to the wheel cylinders 521c, 521d.

Figure 11:
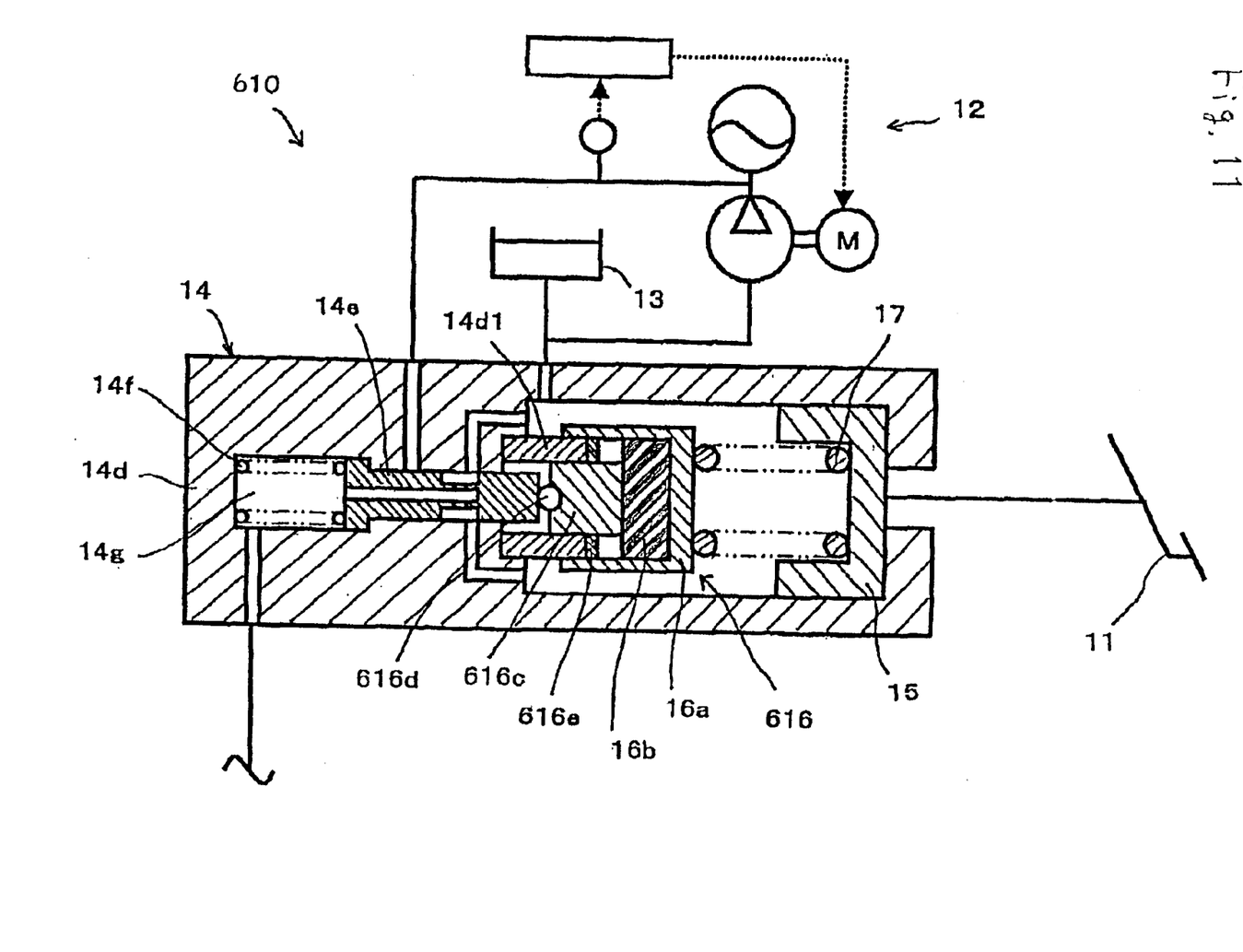
FIG. 11 is a partial cross-sectional view of a braking pressure generating apparatus according to a seventh embodiment of the present invention.

FIG. 11 illustrates a braking pressure generating apparatus 610 according to a seventh embodiment. In the seventh embodiment, the distribution device 16 in FIG. 1 is replaced with a different force distribution device 616. In a manner similar to the fourth embodiment, the cylindrical projecting portion 14d1 is separated from the valve body 14d and is fixed to the valve body 14d. The distribution device 616 further includes a transmission member 616c and a hard, relatively non-deformable ball 616d and an elastic ring plate 616e in addition to the movable member 16a and the rubber member 16b. The transmission member 616c is disposed between the rubber member 16b and the valve spool 14e. The ball 616d is fixed to the left end of the transmission member 616c and contacts the right end of the valve spool 14e. The elastic ring plate 616e made of resin is disposed adjacent the projecting end of the projecting portion 14d1.

The constant distribution ratio of the distribution device 616 can be changed by changing the diameter of the transmission member 616c and the inner diameter of the projecting portion 14d1 so that the relationship between the braking operation force F and the output pressure P of the regulation valve 14 can be changed. The output pressure P of the regulation valve 14 corresponding to the braking operation force F2 can be changed by changing the length of the transmission member 616c, because the space between the rubber member 16b and the projecting portion 14d1 is changed. Thus, the relationship between the braking operation force F and the output pressure P of the regulation valve 14 can be changed while changing a relatively low number of parts.

Referring to FIG. 2, when the braking operation force F becomes greater than F2 in FIG. 2, the elastic ring plate 616e is compressed between the rubber member 16b and the projecting portion 14d1 so that the outer diameter of the ring plate 616e is increased and the inner diameter of the ring plate 616e is decreased. As a result, the rubber member 16b is prevented from moving into the clearance between the projecting member 14d1 and the movable member 16a and the clearance between the projecting member 14d1 and the transmission member 616c. Thus, damage to the rubber member 16b can be reduced or prevented. The elastic ring plate 616e shown in FIG. 11 can be applied to all of the other embodiments described above and illustrated in the drawing figures.

As is apparent from the above explanation, in the embodiments of this invention apart from the stroke simulator 17, the force distribution device 16 is disposed between the valve spool 14e of the regulation valve 14 and the input member 15 to distribute the braking operation force F to the valve spool 14e and the valve body 14d. Thus, it is easy to set both the force distribution characteristic and the stroke simulator characteristic relatively independently to the desired or appropriate characteristics.

The principles, preferred embodiments and modes of operation of the present invention have been described in the foregoing specification. However, the invention which is intended to be protected is not to be construed as limited to the particular embodiments disclosed. Further, the embodiments described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. A braking pressure generating apparatus for a vehicle comprising:
   a hydraulic pressure generator for generating and outputting a power pressure irrespective of operation of a brake pedal;
   an input member adapted to be connected to the brake pedal to receive a braking operation force through the brake pedal;
   a regulation valve disposed coaxially with the input member for regulating the power pressure outputted from the hydraulic pressure generator to a predetermined pressure corresponding to the braking operation force of the brake pedal and outputting the predetermined pressure;
   the regulation valve including a body and a valve portion movably disposed in the body; and
   a force distribution device disposed between the input member and the regulation valve to distribute the braking operation force applied to the input member to the valve portion and the body of the regulation valve;
   wherein the force distribution device includes a one-piece elastic member which contacts both the valve portion and the body of the regulation valve.

2. The braking pressure generating apparatus for a vehicle according to claim 1, wherein the one-piece elastic member is made of rubber.

3. The braking pressure generating apparatus for a vehicle according to claim 1, wherein the force distribution device further includes a movable member disposed between the input member and the one-piece elastic member, the movable member being moved toward the regulation valve by the braking operation force applied to the input member.

4. The braking pressure generating apparatus for a vehicle according to claim 3, wherein the one-piece elastic member is accommodated in the movable member.

5. The braking pressure generating apparatus for a vehicle according to claim 3, further comprising a stroke simulator disposed between the input member and the movable member.

6. The braking pressure generating apparatus for a vehicle according to claim 5, wherein the one-piece elastic member has a projecting portion projecting toward the input member and passing through the movable member, the projecting portion constituting the stroke simulator.

7. The braking pressure generating apparatus for a vehicle according to claim 3, further comprising a spring disposed between the input member and the movable member.

8. The braking pressure generating apparatus for a vehicle according to claim 3, wherein the body of the regulation valve includes a cylindrical projecting portion positioned in the movable member and projecting toward the one-piece elastic member, the cylindrical projecting portion being separate from and fixed to the body, and the force distribution device further includes a transmission member slidably disposed in the cylindrical projecting portion and located between the one-piece elastic member and the valve portion of the regulation valve.

9. The braking pressure generating apparatus for a vehicle according to claim 8, wherein an elastic ring is disposed between the cylindrical projecting portion and the one-piece elastic member to be compressed between the cylindrical projecting portion and the one-piece elastic member.

10. The braking pressure generating apparatus for a vehicle according to claim 1, further comprising a stroke simulator disposed between the input member and the one-piece elastic member.

11. The braking pressure generating apparatus for a vehicle according to claim 1, further comprising a spring disposed between the input member and the one-piece elastic member.

12. The braking pressure generating apparatus for a vehicle according to claim 1, wherein the one-piece elastic member contacts both the valve portion and the body of the regulation valve when the predetermined pressure outputted from the regulation valve is more than a certain pressure.

13. The braking pressure generating apparatus for a vehicle according to claim 12, including a space between the one-piece elastic member and the body of the regulation valve when the predetermined pressure outputted from the regulation valve is less than a certain pressure.

14. The braking pressure generating apparatus for a vehicle according to claim 1, wherein a force distribution rate of the force distribution device changes in response to a change of the braking operation force applied to the input member.

15. The braking pressure generating apparatus for a vehicle according to claim 14, including first contacting surfaces between the one-piece elastic member and the valve portion of the regulation valve, and second contacting surfaces between the one-piece elastic member and the body of the regulation valve, the first contacting surfaces and/or the second contacting surfaces being constructed so that an area of the first contacting surfaces and/or an area of the second contacting surfaces changes in response to a change of the braking operation force applied to the input member.

16. The braking pressure generating apparatus for a vehicle according to claim 15, wherein the one-piece elastic member has a surface positioned in facing relation to the body of the regulation valve, said surface of the one-piece elastic member being tapered outwardly so that a distance between said surface of the one-piece elastic member and the body of the regulation valve increases outwardly along the surface of the one-piece elastic member.

17. The braking pressure generating apparatus for a vehicle according to claim 15, wherein the valve portion of the regulation valve is provided with a recessed portion at a surface which faces the one-piece elastic member.

* * * * *